United States Patent

Schmitt

[15] 3,645,289
[45] Feb. 29, 1972

[54] NONRISE VALVE FOR FAUCETS AND THE LIKE

[72] Inventor: William C. Schmitt, Brown Deer, Wis.
[73] Assignee: Milwaukee Faucets, Inc., Milwaukee, Wis.
[22] Filed: Sept. 8, 1970
[21] Appl. No.: 70,096

[52] U.S. Cl................137/454.2, 137/625.31, 251/185
[51] Int. Cl.............................................F16k 3/10
[58] Field of Search.............137/454.6, 454.2, 625.31; 251/185

[56] References Cited

UNITED STATES PATENTS

| 3,372,710 | 3/1968 | Miller | 137/636.3 |
| 1,014,766 | 1/1912 | Lytton | 137/625.31 |
| 2,923,318 | 2/1960 | Monson | 137/454.6 |
| 3,144,878 | 8/1964 | Williams | 137/625.31 |

*Primary Examiner*—Arnold Rosenthal
*Attorney*—James E. Nilles

[57] ABSTRACT

A valve for a water faucet or the like of the type which when actuated does not have a part that rises, and which valve includes a rotary sealing plate against which spring-loaded seals cooperate to seal the valve when the plate is turned to the "off" position. The valve includes a cartridge which has a stem formed as one piece along with the rotary valve and which also has a sleeve in which the stem rotates, the sleeve also being formed as one piece and providing a seat for the spring-loaded inlet seals.

3 Claims, 2 Drawing Figures

PATENTED FEB 29 1972 3,645,289

INVENTOR:
WILLIAM C. SCHMITT

BY: James E. Nilles
ATTORNEY

NONRISE VALVE FOR FAUCETS AND THE LIKE

BACKGROUND OF THE INVENTION

The invention pertains to valves for water faucets or the like of the nonrise type and in which the valving is accomplished between rotary surfaces and spring-loaded inlet seals bear against one of the rotary members.

Devices of this general character have been proposed, but have heretofore been very complicated and contained numerous parts and were difficult and expensive to manufacture and also required considerable maintenance and repair.

A valve of the general type above referred to is shown in the U.S. Pat. No. 3,372,710, issued Mar. 12, 1968 to L. J. Miller and entitled "Single Handle Faucet Valve."

SUMMARY OF THE PRESENT INVENTION

The present invention provides a nonrise valve cartridge having a one-piece sleeve in which a one-piece stem is rotatably mounted. The stem includes a valve plate which is rotated with the stem and caused to be in alignment with inlet holes in the sleeve when the valve is open. When the valve is to be closed, the plate is turned so as to block the inlet holes. In order to effectively seal the valve when closing, the invention provides spring-loaded inlet seals which bear against the rotatable plate. The arrangement of the seals and the springs within the inlet holes of the sleeve is such that the sleeve can be fabricated from one piece, a minimum number of parts are required, the parts are easy to assemble and good volume flow is assured through the sleeve inlets. The cartridge provided by the present invention is simple in design, compact, economical to manufacture and efficient in performing the functions for which it is designed.

These and other objects and advantages of the present invention will appear hereinafter as this disclosure progresses, reference being had to the accompanying drawings.

DESCRIPTION OF A PREFERRED EMBODIMENT

Figure 1:
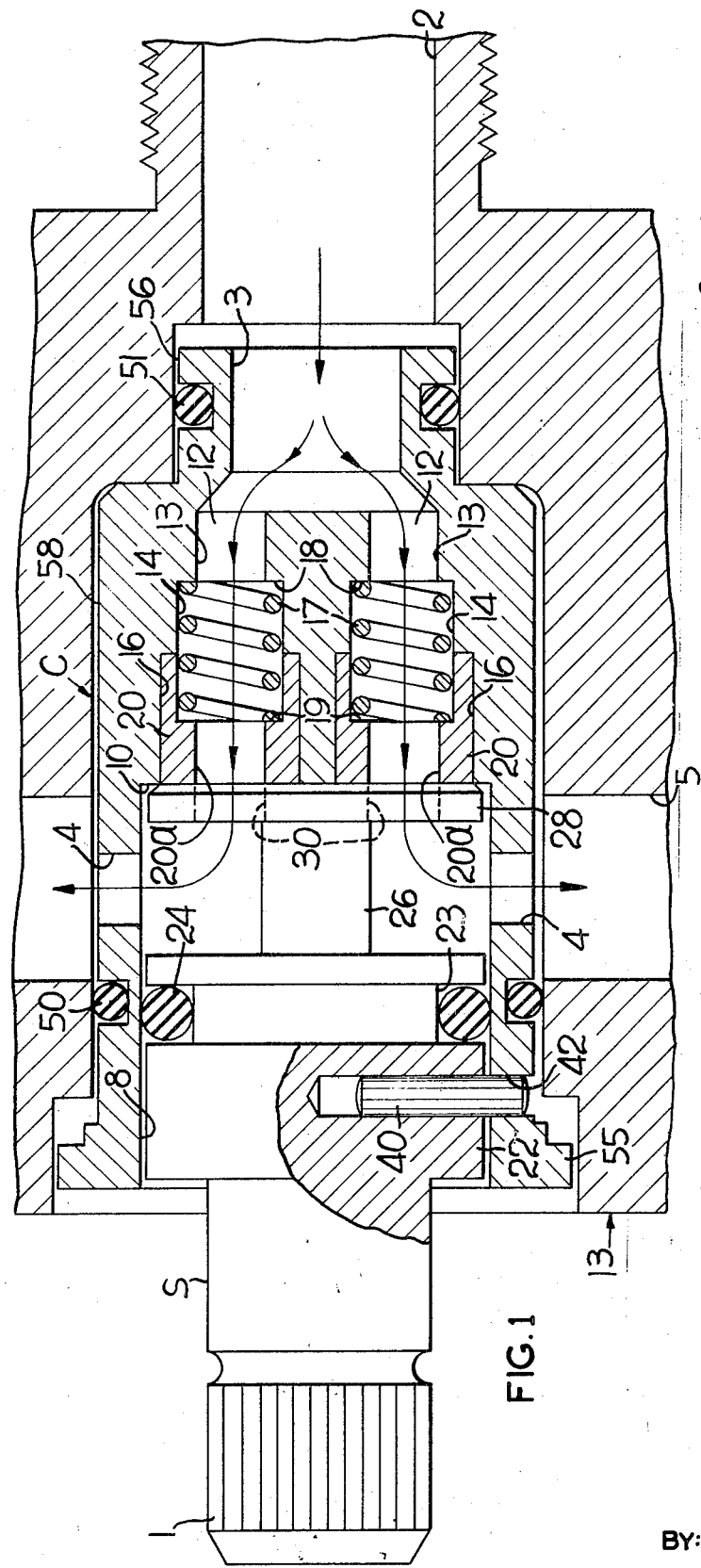
FIG. 1 is a longitudinal, cross-sectional view through a valve embodying the present invention.
Figure 2:
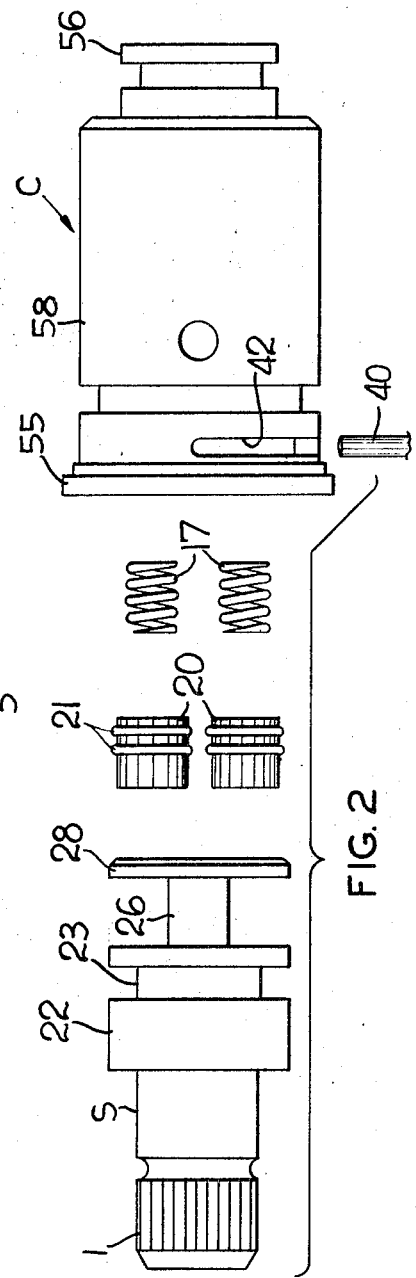
FIG. 2 is an exploded view of some of the parts shown in FIG. 1, on a reduced scale.

The nonrise cartridge C provided by the present invention is located within the valve body B and has the upper portion 1 of its stem S extending above the body. A suitable knob or lever (not shown) can be secured to the stem portion 1 in the known manner so as to be able to rotate the stem within the cartridge C. Water pressure enters the valve body through the opening 2 and enters the opening 3 in the inlet end of the cartridge. The water after passing through the cartridge in a manner to be described, then is permitted to flow out the outlet opening 4 in the cartridge and through the discharge passage 5 of the body.

The valve sleeve is formed from one piece and includes a large, cylindrical chamber or bore 8 adjacent that end opposite the inlet 3. The bore 8 terminates in a lower sealing surface 10 approximately midway between the length of the sleeve. A pair of inlet passages 12 extend from the inlet 3 to the bore 8, and these passages are comprised of bore 13, an intermediate counterbore 14, and a large bore 16 adjacent the surface 10. Mounted within the intermediate bore are springs 17 which bear against the shoulder 18 formed between bore 13 and the counterbore 14, and also which bear against a shoulder 19 of the cylindrical inlet seal 20. The inlet seal 20 fits in the large bore 16 of passage 12 and is urged toward bore 8 by means of the springs 17. Annular ridges 12 around the seals aid in sealing by acting, in effect as O-rings.

The stem S includes a cylindrical portion 22 adjacent the outwardly extending portion 1, an annular groove 23 in which a sealing ring 24 is located for sealing engagement with the bore 8. The stem also includes a narrow neck portion 26 to the end of which is attached the valve plate 28. The stem may be made as a one-piece, integral member, for example, from a metal such as brass. The stem may also be made of two different materials such as brass but having a plastic valve plate 28 fixed therewith, as by being bonded or otherwise attached to the rest of the stem. In any combination of materials, the stem may be considered to be a one-piece member. Valve plate 28 has a pair of holes 30 extending therethrough which are adapted to be in alignment when the stem is turned to the proper position with the inlet passages 12. When the stem is turned to a closed position, the holes 30 are unaligned with the passages 12.

The inlet seals 20 are urged by the springs 17 against the underside or inlet side of the valve plate 28, thereby acting to seal the flow of the fluid past the valve. It will be noted that the internal diameter of the bore 16, the springs 17, and the hole 20a in seals 20 are all of about the same diameter and provide an unimpeded path for the flow of water therethrough without any disruption or turbulence.

It is an easy matter to assemble the valve, it only being necessary to place the springs 17 in their respective bores, then inserting the seals 20, and then sliding the stem, with the O-ring 24 thereon, into the bore and against the sealing surface 10 of the sleeve. A steel roll pin 40 is fixed in the stem S and swings through an arc of about 90° in the recess 42 in cartridge C. The roll pin 40 can be easily inserted or withdrawn from outside of the stem when it is desired to assemble or disassemble the valve.

Suitable seals 50 and 51 are also provided between the sleeve and the valve body.

It will be noted the periphery of the valve body includes flange 55 at one end, a reduced cylindrical portion 56 adjacent the inlet end and an intermediate cylindrical portion 58 between the flange 55 and the small cylindrical portion 56.

The present invention provides a simple and economically produced valve having relatively few parts, which is easy and economical to manufacture. The valve is easy to assemble and disassemble and the sealing arrangement is particularly effective and requires no appreciable maintenance.

I claim:

1. A valve cartridge comprising, a sleeve having an inlet opening at one end, a cylindrical chamber at the other end, an outlet port extending from said chamber to the exterior of said sleeve, said chamber having a transverse sealing surface; inlet fluid passage means extending from said inlet opening to said cylindrical chamber and including a small hole adjacent said inlet opening, an intermediate bore in communication with said small hole, and a larger bore in communication with said intermediate bore and also in communication with said cylindrical chamber; a spring located in said intermediate bore, a generally cylindrical and resilient inlet seal located in said larger bore, said spring acting between said sleeve and said seal, a rotatable valve stem in said cylindrical chamber and including a valve plate having a sealing surface abuttable against said sealing surface of said sleeve, hole means extending through said plate and rotatable with said stem between a position in which said hole means align with said passage means in said sleeve and a position in which said hold means are unaligned to thereby close the valve, said inlet seal being biased by said springs into sealing engagement with said stem plate, and radially removable pin means between said sleeve and said stem for releasably holding said stem in said sleeve while permitting limited rotation therebetween.

2. A nonrise cartridge for a faucet or the like comprising, a sleeve having an inlet opening at one end, a larger cylindrical chamber at the other end, outlet ports extending from said chamber to the exterior of said sleeve, said chamber having a transverse sealing surface; a pair of fluid passages extending from said inlet opening to said cylindrical chamber and each passage including a small hole adjacent said inlet opening, an intermediate counterbore in communication with said small hole, and a larger counterbore in communication with said intermediate counterbore and also in communication with said cylindrical chamber, a spring located in said intermediate counterbore, a generally cylindrical and resilient inlet seal located in said larger counterbore, said spring acting between said sleeve and said seal to urge the latter towards said cylindrical chamber, a rotatable valve stem in said cylindrical chamber and including a valve plate formed integrally therewith and having a sealing surface abuttable against said sealing surface of said sleeve, a pair of holes extending through said plate and rotatable with said stem between a position in which said holes are aligned with said passages in said sleeve and a position in which they are unaligned to thereby close the valve, said inlet seals being biased by said springs into sealing engagement with said stem plate, and removable means between said sleeve and said stem for releasably holding said stem in said sleeve while permitting limited rotation therebetween.

3. A nonrise cartridge for a faucet or the like comprising, a one-piece sleeve having an axially disposed inlet opening at one end, a larger cylindrical chamber at the other end and extending approximately halfway of the length of said sleeve, outlet ports extending radially from said chamber to the exterior of said sleeve, said chamber terminating as a transverse sealing surface at its inner end, a pair of fluid passages extending from said inlet opening and through said sealing surface to communicate with said cylindrical chamber, each passage including a small hole adjacent said inlet opening, an intermediate counterbore in communication with said small hole, and a larger counterbore in communication with said intermediate counterbore and also in communication with said cylindrical chamber; a spring located in said intermediate counterbore, a generally cylindrical and resilient inlet seal having an internal shoulder and located in said larger counterbore, said spring acting between said sleeve and said shoulder of said seal to urge said seal towards said cylindrical chamber, a one-piece rotatable valve stem in said cylindrical chamber and including a valve plate formed integrally therewith and having a flat sealing surface abuttable against said sealing surface of said sleeve, a pair of holes extending through said plate and rotatable with said stem between an open position in which said holes are aligned with said passages in said sleeve and a closed position in which they are unaligned, said inlet seals being biased by said springs into sealing engagement with said flat sealing surface of said valve plate, and means between said sleeve and said stem and removable from the periphery of said sleeve for releasably holding said stem in said sleeve while permitting limited rotation therebetween.

* * * * *